United States Patent
Myoung et al.

(10) Patent No.: US 12,184,314 B2
(45) Date of Patent: Dec. 31, 2024

(54) FREQUENCY-DEPENDENT IQ MISMATCH CALIBRATION FOR RADIO FREQUENCY (RF) TRANSMITTERS

(71) Applicant: NEWRACOM, Inc., Irvine, CA (US)

(72) Inventors: Seong-Sik Myoung, Cupertino, CA (US); Ryunwoo Kim, Irvine, CA (US); Jong-Han Lim, Irvine, CA (US); Jeongki Choi, Aliso Viejo, CA (US); Jaeyoung Ryu, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 5 days.

(21) Appl. No.: 18/316,050

(22) Filed: May 11, 2023

(65) Prior Publication Data

US 2023/0370099 A1    Nov. 16, 2023

Related U.S. Application Data

(60) Provisional application No. 63/364,542, filed on May 11, 2022.

(51) Int. Cl.
  *H04B 1/04*    (2006.01)
  *H04L 27/00*   (2006.01)

(52) U.S. Cl.
  CPC ....... *H04B 1/0475* (2013.01); *H04L 27/0008* (2013.01)

(58) Field of Classification Search
  CPC .......................... H04B 1/0475; H04L 27/0008
  See application file for complete search history.

(56) References Cited

U.S. PATENT DOCUMENTS 11,012,273 B1 *   5/2021   Becker ..................... H04B 1/16

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.

(Continued)

*Primary Examiner* — Rahel Guarino
(74) *Attorney, Agent, or Firm* — Nicholson, De Vos, Webster & Elliott, LLP

(57) ABSTRACT

A method for calibrating a radio frequency (RF) transmitter to compensate for a frequency-dependent in-phase quadrature (FDIQ) mismatch is disclosed. The method may include determining in-phase quadrature (IQ) amplitude and phase mismatches of the RF transmitter for a lower side band (LSB) and an upper side band (USB), determining a FDIQ mismatch based on linear fitting the IQ amplitude and phase mismatches for the LSB and the USB, modifying the FDIQ mismatch based on flipping a FDIQ phase mismatch in the LSB and flipping a FDIQ phase mismatch in the USB to generate a modified FDIQ mismatch, determining Fourier coefficients based on applying an inverse fast Fourier transform to the modified FDIQ mismatch, and determining FIR coefficients for a finite impulse response (FIR) filter of the RF transmitter based on windowing the Fourier coefficients.

19 Claims, 14 Drawing Sheets

(56) References Cited

OTHER PUBLICATIONS

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology-Telecommunicationsand information exchange between systems, Local and metropolitan area networks-Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology-Telecommunications and information exchange between systems, Local and metropolitan area networks-Specific requirements, 2016, 594 pages.

\* cited by examiner

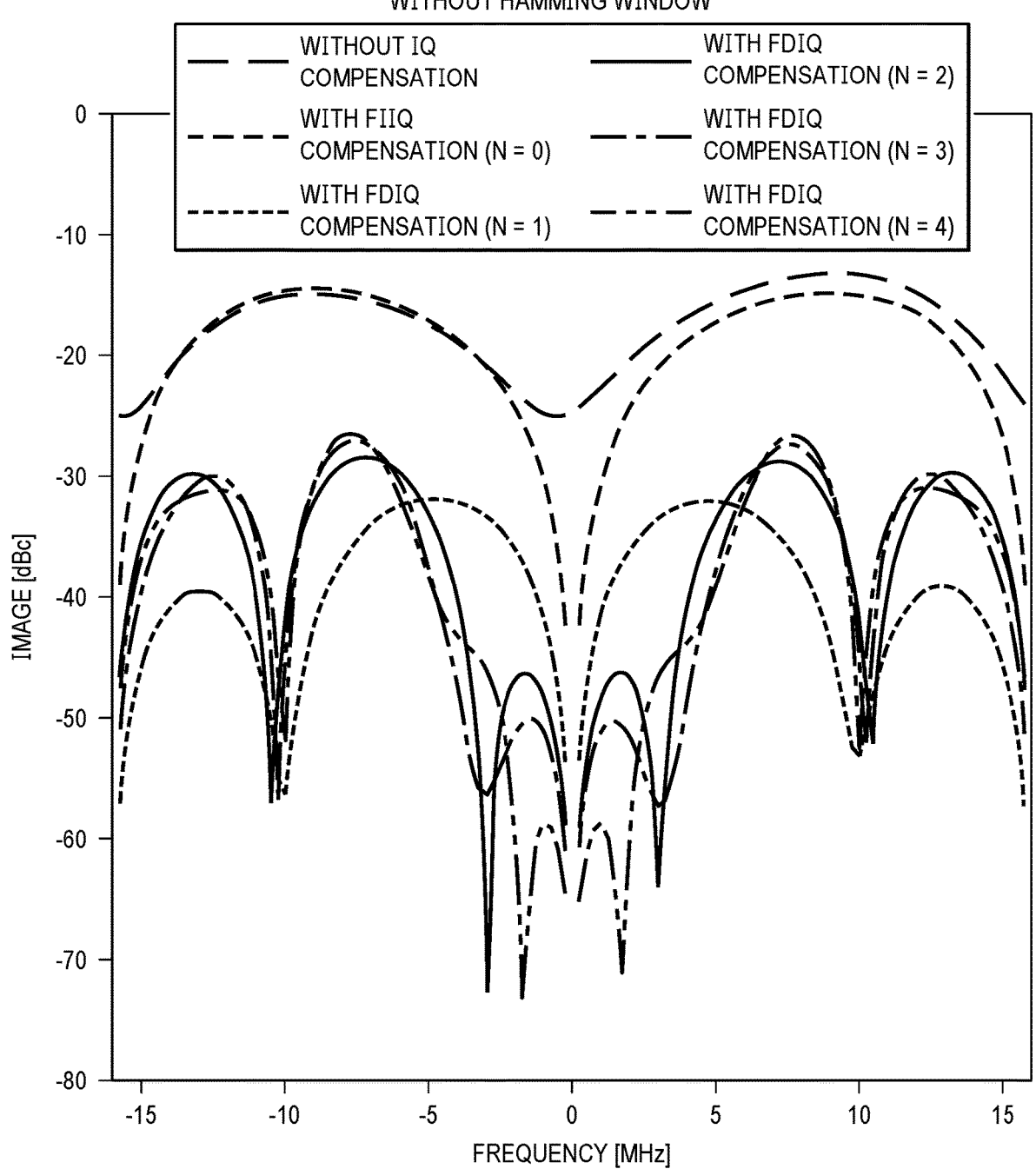

FREQUENCY-DEPENDENT IQ MISMATCH CALIBRATION FOR RADIO FREQUENCY (RF) TRANSMITTERS

CROSS-REFERENCE TO RELATED APPLICATION

This application claims the benefit of U.S. Provisional Application No. 63/364,542, filed May 11, 2022, which is hereby incorporated by reference.

TECHNICAL FIELD

Embodiments of the present disclosure relate to radio frequency (RF) transmitters, and in particular to calibrating a RF transmitter to compensate for a frequency-dependent in-phase quadrature (FDIQ) mismatch.

BACKGROUND

The in-phase (I) and quadrature (Q) paths of radio frequency (RF) transmitters should have the same transfer characteristics in the points of the magnitude and phase of the gain and time delay to avoid RF transmitter performance degradation such as error vector magnitude (EVM) and spectrum emission mask. However, in actual RF transmitter implementations, the I and Q paths have different transfer characteristics, or IQ mismatch, and so an important aspect of the RF transmitter design is the ability to detect IQ mismatch and compensate for it.

Conventional solutions for detecting and compensating for IQ mismatch are able to compensate for frequency-independent IQ mismatch but do not compensate for frequency-dependent IQ mismatch.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 13A and FIG. 13B are diagrams showing a simulated image level with various IQ compensation settings when using the FDIQ mismatch compensation techniques disclosed herein with and without using a hamming window, according to some embodiments.

DETAILED DESCRIPTION

Figure 1:
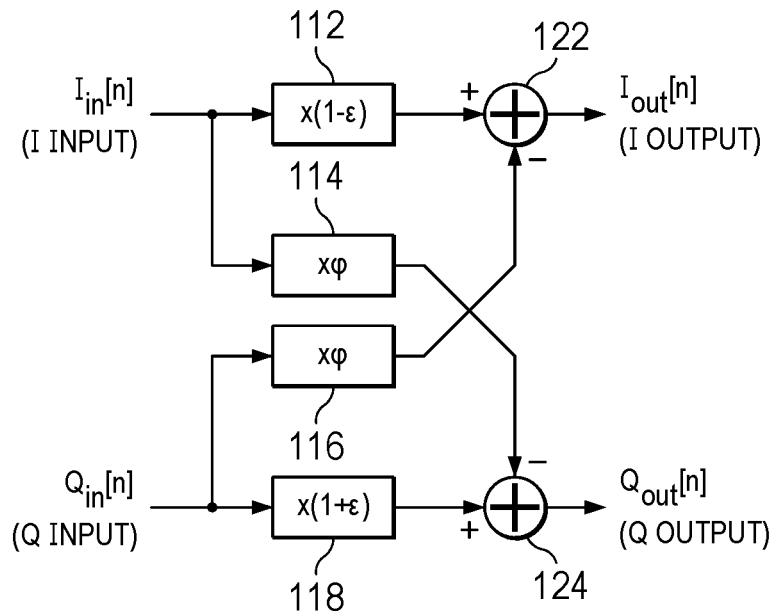
FIG. 1 is a diagram showing the IQ mismatch model of a radio frequency (RF) transmitter.

The present disclosure generally relates to radio frequency (RF) transmitters, and in particular to calibrating a RF transmitter to compensate for a frequency-dependent in-phase quadrature (FDIQ) mismatch.

As mentioned above, conventional solutions for detecting and compensating for IQ mismatch are able to compensate for frequency-independent IQ (FIIQ) mismatch but do not compensate for FDIQ mismatch.

Embodiments are disclosed herein for calibrating a RF transmitter to compensate for a FDIQ mismatch. An embodiment is a method for calibrating a RF transmitter. The method includes determining an in-phase quadrature (IQ) amplitude and phase mismatch of the RF transmitter for a lower side band (LSB) and an IQ amplitude and phase mismatch of the RF transmitter for an upper side band (USB), determining a FDIQ mismatch of the RF transmitter based on linear fitting the IQ amplitude and phase mismatch for the LSB and the IQ amplitude and phase mismatch for the USB, modifying the FDIQ mismatch based on flipping a FDIQ phase mismatch in the LSB and flipping a FDIQ phase mismatch in the USB to generate a modified FDIQ mismatch, determining Fourier coefficients based on applying an inverse fast Fourier transform to the modified FDIQ mismatch, and determining FIR coefficients for a finite impulse response (FIR) filter of the RF transmitter based on windowing the Fourier coefficients. By using the calibration method disclosed herein, the FIR filter can be made simpler and smaller (which allows for lower power consumption), without significantly degrading performance.

An embodiment is a radio frequency (RF) transmitter comprising a frequency-dependent in-phase quadrature (FDIQ) compensation circuit. The FIDQ compensation circuit may comprise a finite impulse response (FIR) filter, wherein the FIR filter is configured with FIR coefficients that allow the FIR filter to compensate for the FDIQ mismatch. In an embodiment, the FIR coefficients are determined using the calibration method mentioned above. For example, the FIR coefficients may be determined based on modifying a FDIQ mismatch of the RF transmitter based on flipping portions of the FDIQ phase mismatch of the RF transmitter, applying an inverse fast Fourier transform to the modified FDIQ mismatch to generate Fourier coefficients, and windowing the Fourier coefficients.

In the following detailed description, only certain embodiments are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a diagram showing the IQ mismatch model of a radio frequency (RF) transmitter. The model receives a complex-valued input signal comprised of a real input signal ($I_{in}[n]$) and an imaginary input signal ($Q_{in}[n]$) and outputs a complex-valued output signal comprised of a real output signal ($I_{out}[n]$) and an imaginary output signal ($Q_{out}[n]$). The input signals are multiplied based on an amplitude mismatch value ($\varepsilon$) and a phase mismatch value ($\varphi$), as represented by multipliers 112, 114, 116, and 118, and the resulting signals are added, as represented by adders 122 and 124, to generate the output signals. Multiplier 112 multiplies by ($1-\varepsilon$), multipliers 114 and 116 multiply by $\varphi$, and multiplier 118 multiplies by ($1+\varepsilon$). Adder 122 adds the output of multiplier 112 and subtracts the output of multiplier 116. Adder 124 subtracts the output of multiplier 114 and adds the output of multiplier 118.

Figure 2:
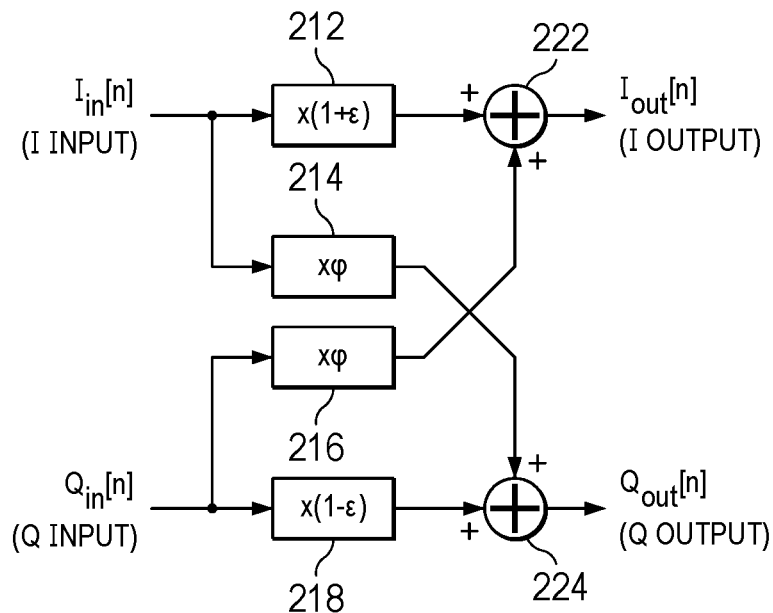
FIG. 2 is a diagram showing the IQ mismatch compensation in a RF transmitter.

FIG. 2 is a diagram showing the IQ mismatch compensation in a RF transmitter. The IQ mismatch compensation processes a complex-valued input signal comprised of a real input signal ($I_{in}[n]$) and an imaginary input signal ($Q_{in}[n]$) and outputs a complex-valued output signal comprised of a real output signal ($I_{out}[n]$) and an imaginary output signal ($Q_{out}[n]$). The input signals are multiplied using multipliers 212, 214, 216, and 218 using an amplitude mismatch value ($\varepsilon$) and a phase mismatch value ($\varphi$), and then added using adders 222 and 224, as shown in the diagram, to generate the output signals. Multiplier 212 multiplies by ($1+\varepsilon$), multipliers 214 and 216 multiply by $\varphi$, and multiplier 218 multiplies by ($1-\varepsilon$). Adder 222 adds the outputs of multiplier 212 and 214. Adder 224 adds the outputs of multiplier 214 and 218.

With the IQ mismatch compensation solution shown in FIG. 2, the IQ amplitude ($\varepsilon$) and phase mismatch ($\varphi$) of the RF transmitter can be compensated by cascading the IQ mismatch compensation block based on the following equations:

$$\begin{bmatrix} I_{RF\_IN} \\ Q_{RF\_IN} \end{bmatrix} = \begin{bmatrix} 1+\varepsilon_{TX} & \varphi_{TX} \\ \varphi_{TX} & 1-\varepsilon_{TX} \end{bmatrix} \cdot \begin{bmatrix} I_{IN} \\ Q_{IN} \end{bmatrix} \quad \text{Equation 1}$$

$$\begin{bmatrix} I_{RF\_OUT} \\ Q_{RF\_OUT} \end{bmatrix} = \begin{bmatrix} 1-\varepsilon_{TX} & -\varphi_{TX} \\ -\varphi_{TX} & 1+\varepsilon_{TX} \end{bmatrix} \cdot \begin{bmatrix} I_{RF\_IN} \\ Q_{RF\_IN} \end{bmatrix}$$

$$\begin{bmatrix} I_{RF_{OUT}} \\ Q_{RF_{OUT}} \end{bmatrix} = \begin{bmatrix} 1-\varepsilon_{TX} & -\varphi_{TX} \\ -\varphi_{TX} & 1+\varepsilon_{TX} \end{bmatrix} \cdot \begin{bmatrix} I_{RF_{IN}} \\ Q_{RF_{IN}} \end{bmatrix}$$

$$= \begin{bmatrix} 1-\varepsilon_{TX} & -\varphi_{TX} \\ -\varphi_{TX} & 1+\varepsilon_{TX} \end{bmatrix} \cdot \begin{bmatrix} 1+\varepsilon_{TX} & \varphi_{TX} \\ \varphi_{TX} & 1-\varepsilon_{TX} \end{bmatrix} \cdot \begin{bmatrix} I_{IN} \\ Q_{IN} \end{bmatrix}$$

$$= \begin{bmatrix} 1-\varepsilon_{TX}^2 - \varphi_{TX}^2 & 0 \\ 0 & 1-\varepsilon_{TX}^2 - \varphi_{TX}^2 \end{bmatrix} \cdot \begin{bmatrix} I_{IN} \\ Q_{IN} \end{bmatrix}$$

$$= (1-\varepsilon_{TX}^2 - \varphi_{TX}^2) \cdot \begin{bmatrix} I_{IN} \\ Q_{IN} \end{bmatrix}$$

In equations 1, $I_{IN}$ and $Q_{IN}$ are the inputs of the IQ mismatch compensation, $I_{RF\_IN}$ and $Q_{RF\_IN}$ are the outputs of the IQ mismatch compensation or the inputs of the RF transmitter analog blocks, and $I_{RF\_OUT}$ and $Q_{RF\_OUT}$ are the outputs of the RF transmitter. $\varepsilon_{TX}$ represents the amplitude mismatch and $\varphi_{TX}$ represents the phase mismatch.

As shown in equations 1, the I and Q paths of the cascaded RF transmitter with the IQ mismatch compensation have the same transfer characteristics, and the IQ mismatch is compensated. However, with this solution, the frequency dependency of the IQ mismatch (or $\varepsilon$ and $\varphi$) is not carefully considered, and the frequency dependency of the IQ mismatch is not compensated.

Figure 3:
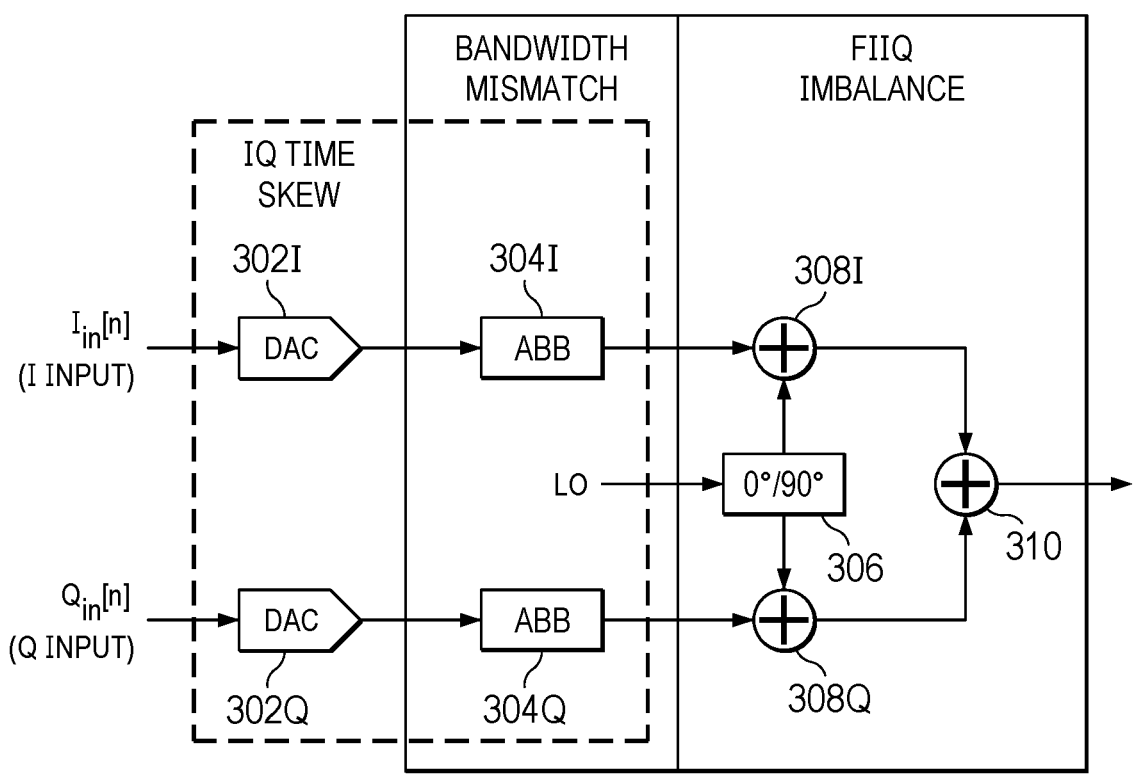
FIG. 3 is a diagram showing a RF transmitter model with FDIQ mismatch, according to some embodiments.

FIG. 3 is a diagram showing a RF transmitter model with FDIQ mismatch, according to some embodiments. As shown in the diagram, the RF transmitter model includes an I path digital-to-analog converter (DAC) block 302I, a Q path DAC block 302Q, an I path analog baseband block (ABB) 304I, a Q path ABB 304Q, a local oscillator (LO) block 306, an I path adder block 308I, a Q path adder block 308Q, and an adder block 310.

The IQ mismatch can be categorized as frequency-independent IQ mismatch (or "FIIQ" mismatch) and frequency-dependent IQ mismatch ("FDIQ" mismatch). The FIIQ mismatch is mainly caused by the different amplitude and phase characteristics of the quadrature LO signals and the mixer gain. The FDIQ mismatch is mainly caused by the bandwidth mismatch and the IQ time skew of the analog baseband (ABB) blocks 304 such as the analog low-pass filter (LPF). The IQ time skew is the difference between the time delay of the I and Q paths. Because of the low power design of the ABBs 304 and the limited gain-bandwidth product of the operational amplifier (OPA) in the ABB 304, the I and Q paths may have different group delay characteristics, which is the most common reason for the FDIQ mismatch of modern low-power RF transmitters.

Figure 4:
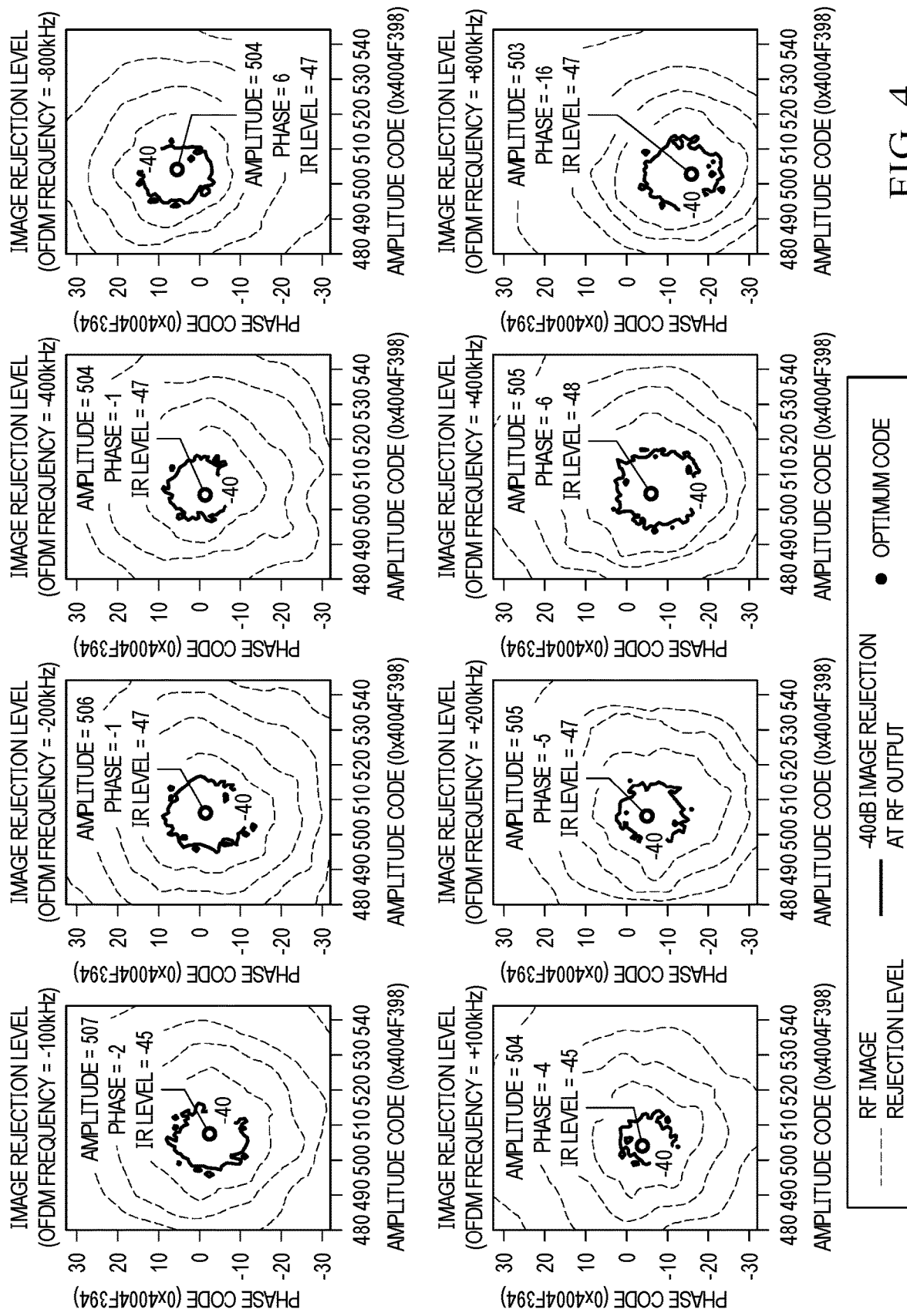
FIG. 4 is a diagram showing the measured image level relative to the fundamental signal with a fundamental signal frequency sweep from −800 kilohertz (kHz) to +800 kHz.

FIG. 4 is a diagram showing the measured image level relative to the fundamental signal with a fundamental signal frequency sweep from −800 kilohertz (kHz) to +800 kHz. In the diagram, the x-axis represents the amplitude mismatch ($\varepsilon$) compensation and the y-axis represents the phase mismatch ($\varphi$) compensation.

As shown in the diagram, the optimum code (amplitude and phase) is different in frequency from −800 kHz to +800 kHz, which indicates there is a frequency-independent IQ mismatch impairment. If the optimum code has same optimum code in different frequencies, then this indicates that there is a frequency-dependent IQ mismatch impairment.

Figure 5:
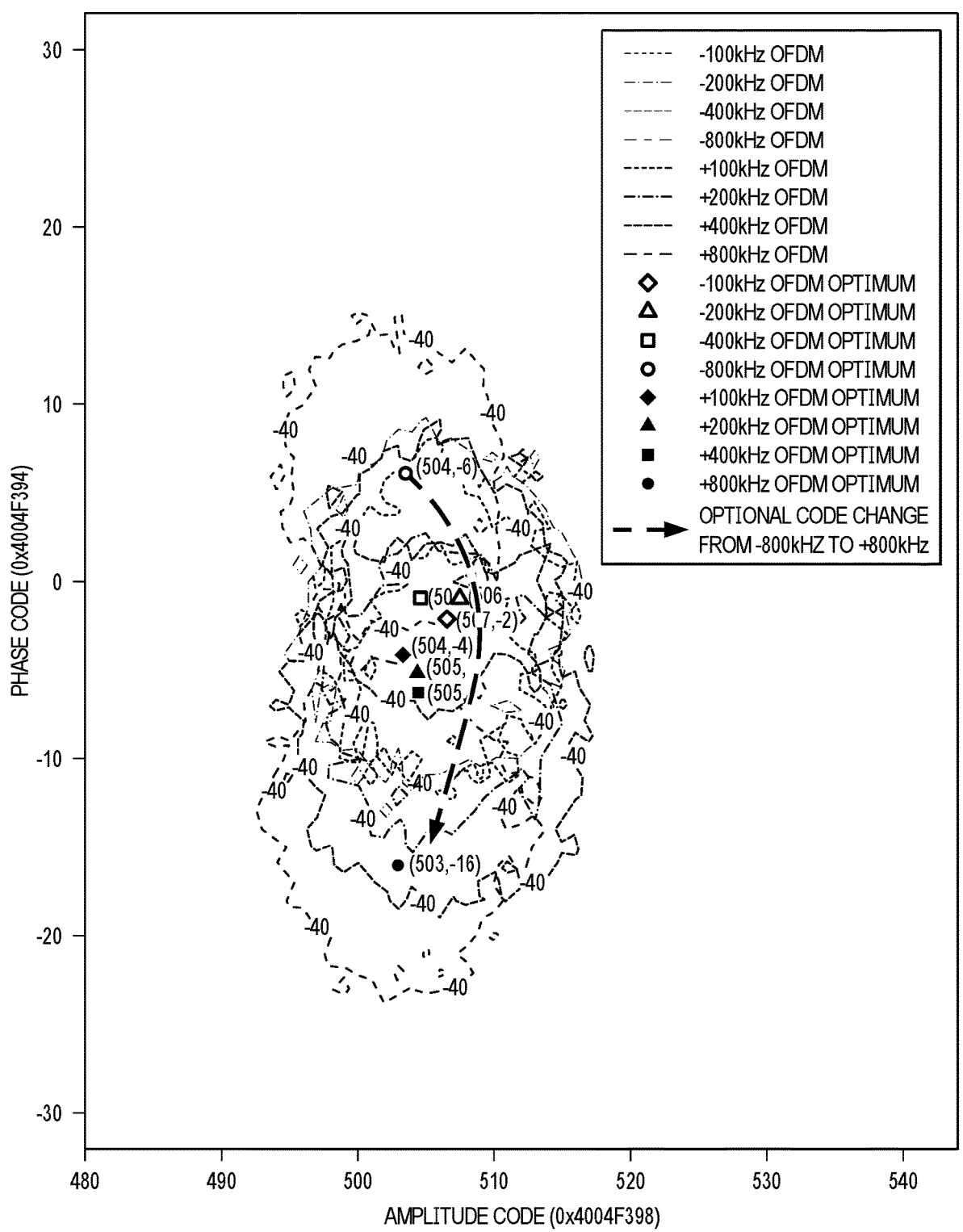
FIG. 5 is a diagram showing the −40 decibel (dB) image contours of a measured image level for various frequencies.

FIG. 5 is a diagram showing the −40 decibel (dB) image contours of a measured image level for various frequencies. As shown in the diagram, the optimum phase mismatch compensation code is linearly varied with the frequency sweep, while the optimum amplitude mismatch compensation code is a constant. This is because the FDIQ mismatch is caused by the IQ time skew and the IQ time skew can be represented as the phase offset ($\emptyset_{IQ}$) between the I and Q paths with strong frequency dependency as shown in the following equations:

$$\emptyset_{IQ} = 2\pi f \cdot \Delta t_{IQ}$$

$$\varphi(\omega) = \sin(\emptyset_{IQ}) \approx 2\pi f \cdot \Delta t_{IQ} \quad \text{Equations 2}$$

In equations 2, $\Delta t_{IQ}$ represents the IQ time skew and $\omega = 2\pi f$.

The present disclosure describes a technique to detect and compensate for FDIQ mismatch in a RF transmitter caused by the IQ time skew. Embodiments provide a FDIQ mismatch compensation module that includes a finite impulse response (FIR) filter. As will be described further herein, the FIR coefficients of the FIR filter may be configured to allow the FIR filter to compensate for a FDIQ mismatch. The FIR coefficients may be determined using a new calibration method, which is further described herein.

Figure 6:
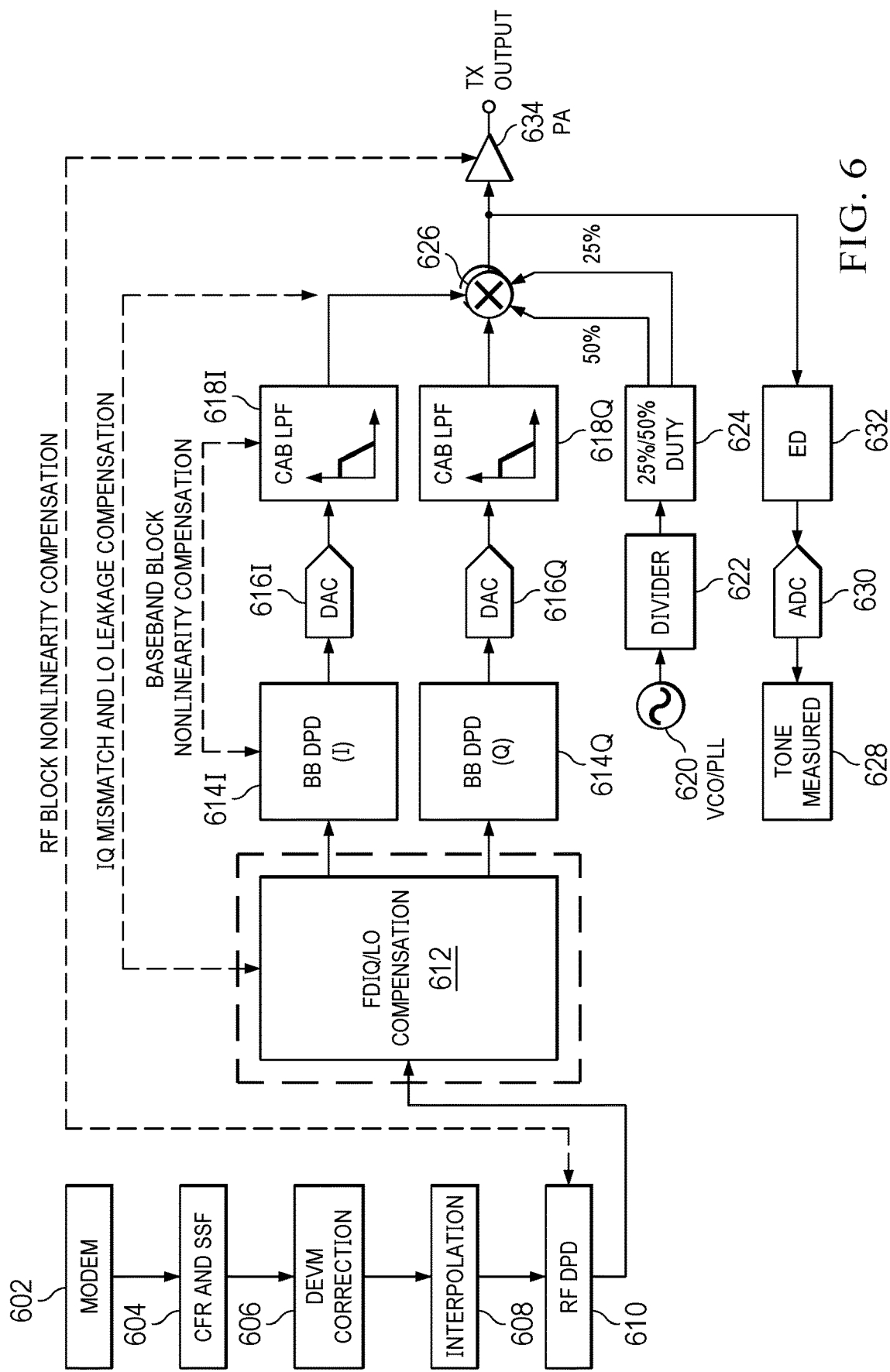
FIG. 6 is a diagram showing a portion of a RF transmitter chain that includes a FDIQ mismatch compensation module, according to some embodiments.

FIG. 6 is a diagram showing a portion of a RF transmitter chain that includes a FDIQ mismatch compensation module, according to some embodiments.

As shown in the diagram, the RF transmitter chain includes a modem module 602, a crest factor reduction (CFR) and spectral shaping filter (SSF) module 604, a dynamic error vector magnitude (DEVM) correction module 606, an interpolation module 608, a RF digital pre-distortion (DPD) module 610, an IQ mismatch/local oscillator leakage (IQ/LO) compensation module 612, an I-path baseband (BB) DPD module 614I, a Q-path BB DPD module 614Q, an I-path digital-to-analog converter (DAC) 616I, a Q-path DAC 616Q, an I-path configurable analog block (CAB) low-pass filter (LPF) module 618I, a Q-path CAB LPF module 618Q, a mixer 626, a voltage-controlled oscillator (VCO) and phase-locked loop (PLL) module 620, a divider module 622, a 25%/50% duty module 624, and a power amplifier (PA) module 634.

In an embodiment, as shown in the diagram, the RF transmitter chain further includes an envelope detector (ED) module 632, an analog-to-digital (ADC) converter module 630, and a tone measurement module 628.

In an embodiment, one or more of the modules of the RF transmitter chain may be implemented using purpose-built electronic circuitry, field-programmable logic, processors executing computer programming instructions (also referred to as "computer code") stored on non-transitory computer readable media, or combinations thereof, but embodiments are not limited thereto.

The modem module 602 may produce an output signal comprising a sequence of digital values. The digital values may represent complex numbers and accordingly each digital value may include a real value (I) and a complex value (Q) each expressed as a number represented by a plurality of bits. In an embodiment, the modem module 602 may be a modem designed to produce signals according to a wireless standard. For example, the modem module 602 may be a modem that is compatible with an Institute of Electrical and Electronics Engineers (IEEE) 802.11 standard.

The CFR and SSF module 604 may process the output of the modem module 602 and provide the processed output to the DEVM correction module 606. The processing of the output of the modem module 102 by the CFR and SSF module 604 may provide proper spectrum shaping and error vector magnitude (EVM), and may reduce the peak-to-average power ratio (PAPR) of the output.

The DEVM correction module 606 may compensate for the variation in the instantaneous gain of the RF transmitter chain that may occur due to, for example, the RF transmitter chain experiencing a change in temperature after the RF transmitter chain begins transmitting. The DEVM correction module 606 may produce an output by applying a time-varying gain to a signal received from the modem module 602.

The interpolation module 608 may include an up-sampler and an anti-aliasing filter. The interpolation module 608 may interpolate the output of the DEVM correction module 606.

The RF DPD module 610 may pre-distort the output of the interpolation module 608 to compensate for non-linearities in the PA module 634, and in particular for variations in the gain of the PA module 634 that depend on the magnitude of the signal input to the PA module 634. The RF DPD module 610 may compensate for amplitude-to-amplitude modulation (AM2AM) nonlinearity, amplitude-to-phase modulation (AM2PM) nonlinearity, or both.

The IQ/LO compensation module 612 may modify the output of the RF DPD module 610 to compensate for any mismatch between the analog portion of the real (I) path and the analog portion of the imaginary (Q) path, for DC offset in the mixer 626, for leakage from the local oscillator, or for combinations thereof. This operation may also be referred to as carrier suppression/image rejection (CS/IR) calibration. The IQ/LO compensation module 612 may receive input signals comprising complex-valued numbers and may output a real component and an imaginary component each comprising respective real-valued numbers.

The real component of the output of the FDIQ/LO compensation module 612 may be provided to the I-path BB DPD module 614I, and the imaginary component of the output of the IQ/LO compensation module 612 may be provided to the Q-path BB DPD module 614Q.

In an embodiment, the IQ/LO compensation module 612 includes a FIR filter that is configured to compensate for FDIQ mismatch of the RF transmitter. As will be described herein below, the FIR coefficients of the FIR filter may be determined using the calibration method disclosed herein to allow the RF transmitter to compensate for a FDIQ mismatch.

The I-path BB DPD module 614I may compensate for nonlinearity caused by I-path baseband blocks such as the I-path CAB LPF 618I and the mixer 626. The I-path BB DPD module 614I may compensate for only AM2AM distortion because the signals in the I-path are real-valued (i.e., not complex-valued) signals.

Similarly, the Q-path BB DPD module 614Q may compensate for nonlinearity caused by Q-path baseband blocks such as the Q-path CAB LPF 618Q and the mixer 626. The Q-path BB DPD module 614Q may compensate for only AM2AM distortion because the signals in the Q-path are real-valued (i.e., not complex-valued) signals.

The I-path DAC module 616I may convert the output of the I-path BB DPD module 613I from multi-bit digital values to corresponding analog values. Similarly, the Q-path DAC module 616Q may convert the output of the Q-path BB DPD module 614Q from multi-bit digital values to corresponding analog values. In an embodiment, the DAC modules 616I and 616Q have a sampling rate $f_s$ of 32 MHz.

The I-path CAB LPF module 618I may filter the output of the I-path DAC module 616I. In an embodiment, the I-path CAB LPF module 618I has a selectable cut-off frequency (e.g., the cut-off frequency may be configurable to be any one of a 1.5 MHz, 3 MHz, and 6 MHz) but embodiments are not limited thereto.

Similarly, the Q-path LPF module 618Q may filter the output of the Q-path DAC module 616Q. In an embodiment, the Q-path CAB LPF module 618Q has a selectable cut-off frequency (e.g., the cut-off frequency may be configurable to be any one of a 1.5 MHz, 3 MHz, and 6 MHz) but embodiments are not limited thereto.

The VCO/PLL module 620 may produce a RF signal having a frequency according to a control voltage provided to the VCO/PLL module 620. In an embodiment, the VCO/PLL module 620 produces a signal having a frequency ($f_{osc}$) in the range of 3 to 3.8 GHz, according to the control voltage.

The divider module 622 may produce a carrier signal by performing frequency division on the output of the VCO/PLL module 620. In an embodiment, the ratio of the frequency division is selectable. For example, the divider module 622 may divide the output of the VCO 620 by either 4 or 6 according to a control signal provided to the divider module 622. Accordingly, in an embodiment where the VCO/PLL module 620 produces a signal having a frequency in the range of 3 to 3.8 GHz, the divider module 622 may produce a carrier signal having a frequency of 750 MHZ to 950 MHz if the frequency division is selected to be 4.

The 25%/50% duty module 624 may generate a 50% duty cycle LO signal and a 25% duty cycle LO signal based on the output of the divider module 622.

The mixer 626 may combine the outputs of CAB LPFs 618 and the output of the 25%/50% duty module 624 to produce a modulated RF signal.

The PA module 634 may amplify the modulated RF signal and provide it as a transmission (Tx) output.

For RF nonlinearity caused by the RF blocks such as the PA module 634, which may include AM2AM and AM2PM distortion, this RF nonlinearity may be compensated by an RF DPD module 610 or process. This impairment may also be caused by back-end blocks that perform I (in-phase) and Q (quadrature-phase) merging, such as an up-conversion mixer 626.

FixeFor compensation of IQ mismatch and local oscillator (LO) leakage, a IQ/LO compensation module 612 or process may be used.

For BB (baseband) nonlinearity caused by the baseband blocks such as the CAB LPF 618, which only has AM2AM distortion because it is caused by the front-end blocks before the I and Q merging, this impairment may be compensated by BB DPD modules 614 or processes. As previously described, a BB DPD module 614 or process may be included for each of an I signal path and a Q signal path.

The ED module 632 may take the output of the mixer 626 as input and provide the envelope of the input signal as a baseband signal output.

The ADC module 630 may convert the output of the ED module 632 from analog values to corresponding multi-bit digital values. The ADC module 630 may provide the digital values to the tone measurement module 628.

The tone measurement module 628 may measure LSB IQ mismatch and USB IQ mismatch (which can be used for calibration, as will be described in further detail herein).

While a certain configuration of components is shown in the diagram to illustrate a particular example of a RF transmitter chain, it should be appreciated that other embodiments may use a different configuration (e.g., they may include additional components, omit certain components, combine certain components, and/or use a different arrangement of components).

Figure 7:
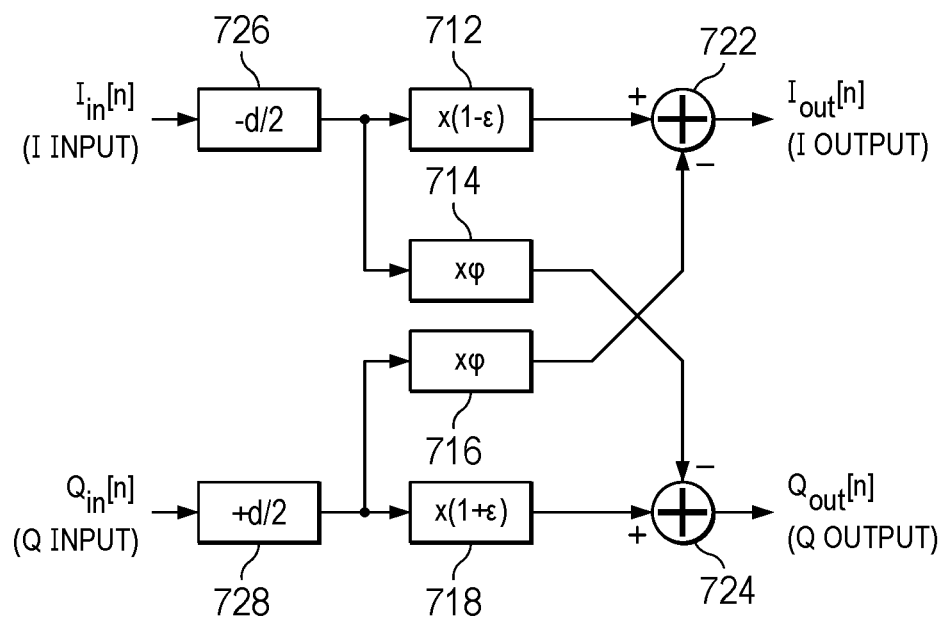
FIG. 7 is a diagram showing a FDIQ mismatch model with IQ time skew, according to some embodiments

FIG. 7 is a diagram showing a FDIQ mismatch model with IQ time skew, according to some embodiments.

The model receives a complex-valued input signal comprised of a real input signal ($I_{in}[n]$) and an imaginary input signal ($Q_{in}[n]$) and outputs a complex-valued output signal comprised of a real output signal ($I_{out}[n]$) and an imaginary output signal ($Q_{out}[n]$). As shown in the diagram, the I input and the Q input have a normalized IQ time skew of d (e.g., $d=\Delta t_{IQ}/t_s=\Delta t_{IQ}*f_s$, where $\Delta t_{IQ}$ is an IQ time skew, $t_s$ is the time step of the model and system, and $f_s$ is the sampling frequency (where $1/t_s=f_s$)), as represented by blocks 726 and 728. The input signals are multiplied based on an amplitude mismatch value ($\varepsilon$) and a phase mismatch value ($\varphi$), as represented by multipliers 712, 714, 716, and 718, and then the resulting signals are added, as represented by adders 722 and 724, to generate the output signals. Multiplier 712 multiplies by ($1-\varepsilon$), multipliers 714 and 716 multiply by $\varphi$, and multiplier 718 multiplies by ($1+\varepsilon$). Adder 722 adds the output of multiplier 712 and subtracts the output of multiplier 716. Adder 724 subtracts the output of multiplier 714 and adds the output of multiplier 718.

Figure 8:
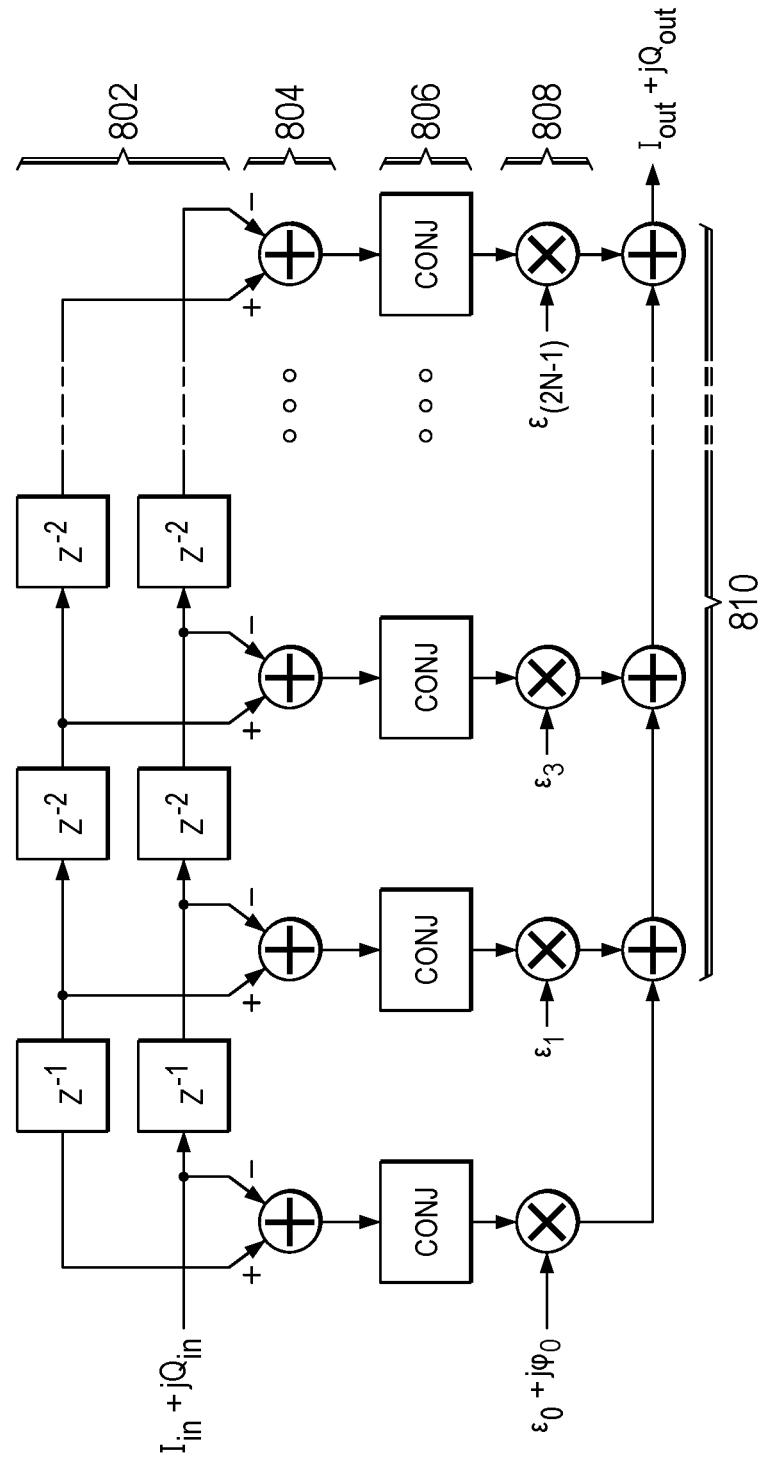
FIG. 8 is a diagram showing a generalized FDIQ mismatch compensation block, according to some embodiments.

FIG. 8 is a diagram showing a generalized FDIQ mismatch compensation block, according to some embodiments.

As shown in the diagram, the FDIQ mismatch compensation block is based on a complex finite impulse response (FIR) filter with one multiplier with a complex coefficient and N multipliers with real coefficients.

The input of the FDIQ mismatch compensation block is input signal $I_{in}+jQ_{in}$ and the output of the FDIQ mismatch compensation block is output signal is $I_{out}+jQ_{out}$. The generalized FDIQ mismatch compensation block includes N*2 Z transform blocks 802 (the "exponent" of the Z transform block represents delay) (in embodiments, all delays except the first delay is a "–2" delay), N adders 804, N+1 conjugate function blocks 806, N+1 multipliers 808 (one multiplier with a complex coefficient and N multipliers with real coefficients), and N adders 810. Thus, the generalized FDIQ mismatch compensation block has N FIR taps for FDIQ mismatch compensation. The coefficients of the FDIQ mismatch compensation block are $\varepsilon_0+j\varphi_0$, $\varepsilon_1$, $\varepsilon_3$, ..., $\varepsilon_{(2N-1)}$.

Figure 9:
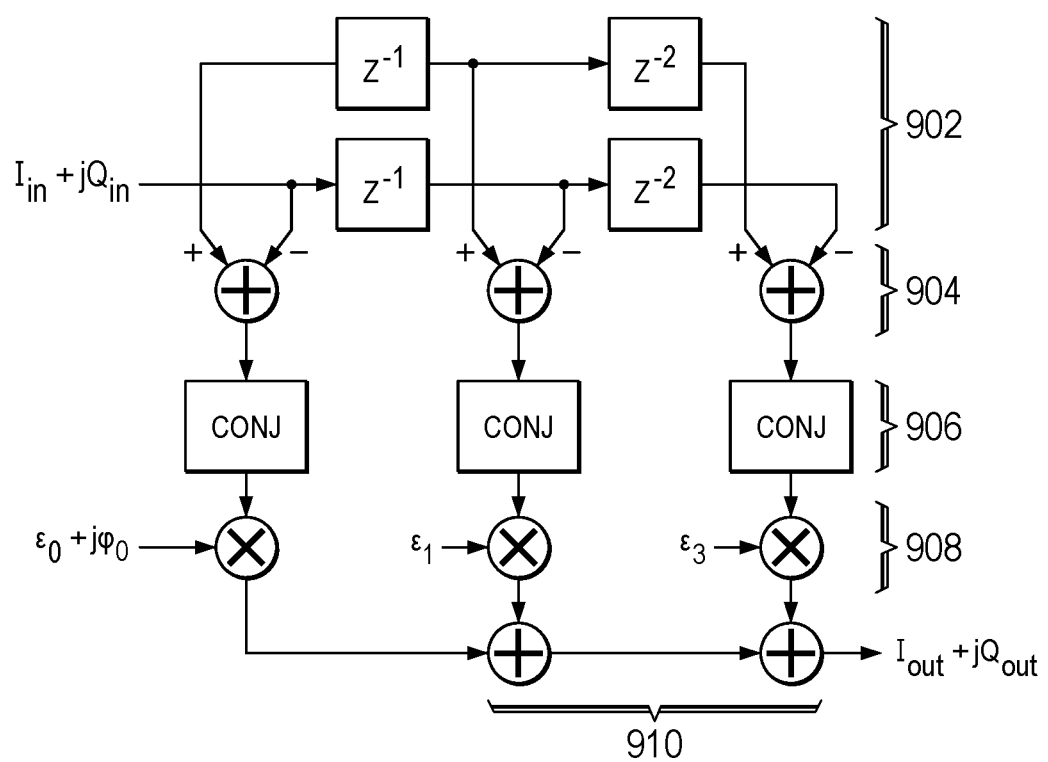
FIG. 9 is a diagram showing a FDIQ mismatch compensation block where N=2, according to some embodiments.

FIG. 9 is a diagram showing a FDIQ mismatch compensation block where N=2, according to some embodiments. The input of the FDIQ mismatch compensation block is input signal $I_{in}+jQ_{in}$ and the output of the FDIQ mismatch compensation block is output signal is $I_{out}+jQ_{out}$. The FDIQ mismatch compensation block includes four Z transform blocks 902, two adders 904, three conjugate function blocks 906, three multipliers 908 (one multiplier with a complex coefficient and two multipliers with real coefficients), and two adders 910. Thus, the FDIQ mismatch compensation block has two FIR taps for FDIQ mismatch compensation. The coefficients of the FDIQ mismatch compensation block are $\varepsilon_0+j\varphi_0$, $\varepsilon_1$, and $\varepsilon_3$.

Figure 10:
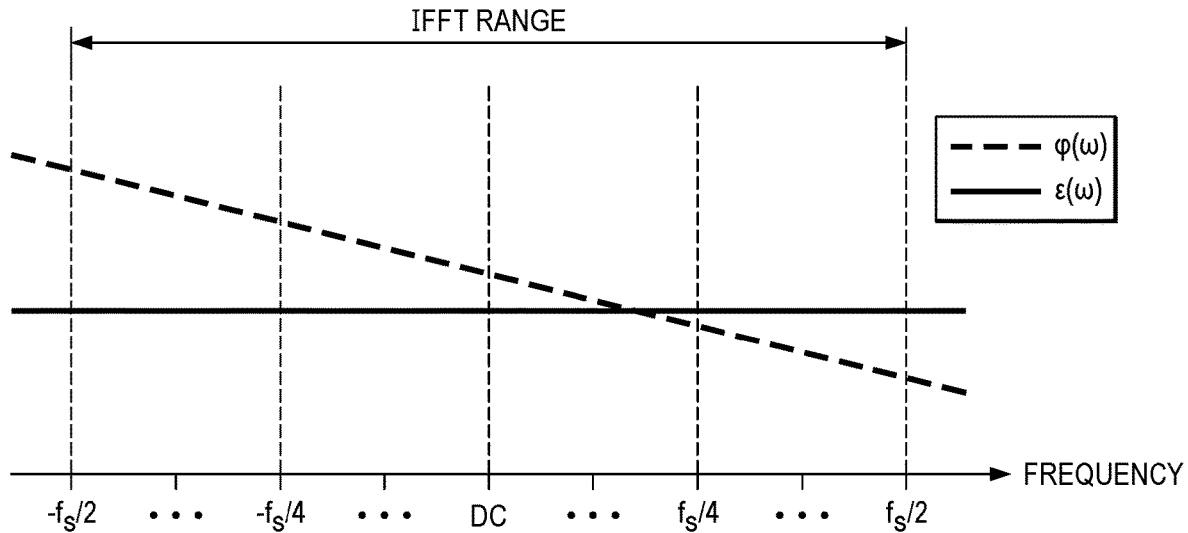
FIG. 10 is a diagram showing the real FDIQ amplitude and phase mismatch, according to some embodiments.

FIG. 10 is a diagram showing the real FDIQ amplitude and phase mismatch, according to some embodiments. As shown in the diagram, for the FDIQ mismatch created due to the IQ time skew, the FDIQ amplitude mismatch ($\varepsilon(\omega)$) is constant with respect to frequency variation but the FDIQ phase mismatch ($\varphi(\omega)$) is linearly proportional to the frequency variation. In the diagram, $f_s$ is the sampling rate of the FIR filter. The inverse fast Fourier transform (IFFT) range is between $-f_s/2$ and $+f_s/2$.

In an embodiment, FDIQ mismatch compensation can be realized by using a complex FIR filter. The coefficients of the FIR filter may be determined by applying the IFFT to the FDIQ mismatch (applying IFFT to $\varepsilon(\omega)+j\varphi(\omega)$). However, the FDIQ phase mismatch ($j\varphi(\omega)$) has large discontinuity at the IFFT boundaries, and thus an increased number of taps in the complex FIR filter is required to accurately represent the FDIQ phase mismatch. According to the Nyquist sampling theory, frequencies from $-f_s/2$ to $+f_s/2$ can be analyzed, and the signals from frequencies $-f_s/2$ to $+f_s/2$ repeat every $N*f_s$. Thus, the phase mismatch ($\varphi$) is discontinuous at IFFT boundaries.

In an embodiment, the FDIQ phase mismatch is modified as follows to make the FIR filter simpler and smaller (which allows for lower power consumption), without degrading performance.

1) The FDIQ phase mismatch from frequencies $-f_s/2$ to $-f_s/4$ is regenerated by flipping the FDIQ phase mismatch from $-f_s/4$ to DC (the lower side band (LSB)). DC refers to direct current (or 0 Hertz).

2) The FDIQ phase mismatch from $f_s/4$ to $f_s/2$ is regenerated by flipping the FDIQ phase mismatch from DC to $f_s/4$ (the upper side band (USB)).

Figure 11:
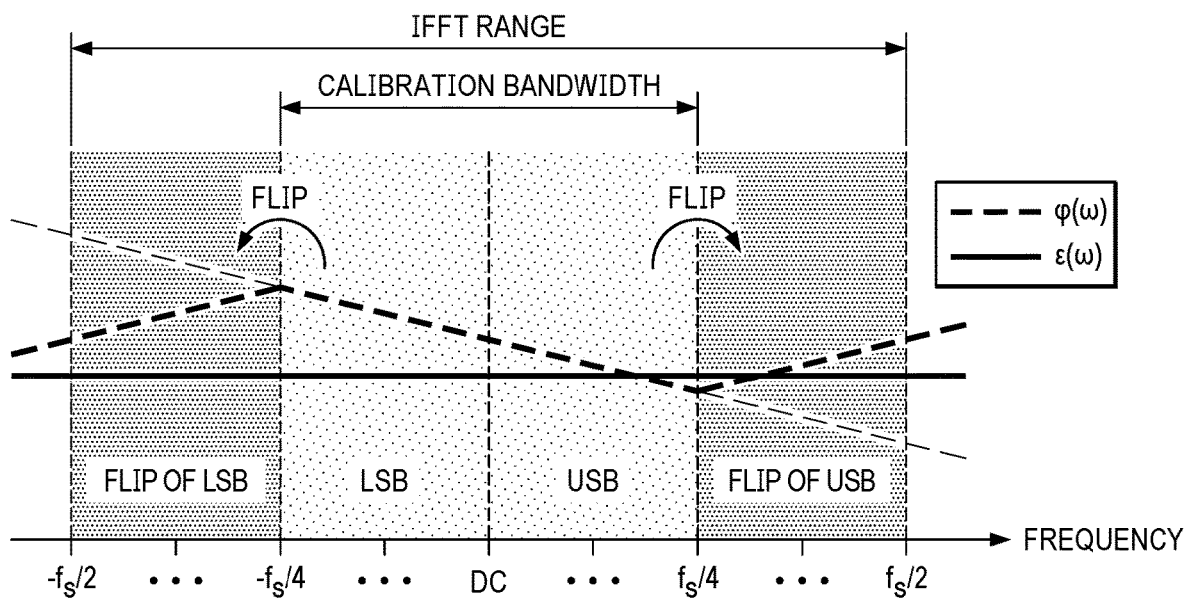
FIG. 11 is a diagram showing a modified FDIQ mismatch, according to some embodiments.

FIG. 11 is a diagram showing a modified FDIQ mismatch, according to some embodiments. As shown in the diagram and described above, the modified FDIQ phase mismatch may be generated by flipping the FDIQ phase mismatch in the LSB and flipping the FDIQ phase mismatch in the USB.

In an embodiment, the modified FDIQ mismatch and its IFFT can be expressed according to the following equations:

$$\varepsilon(\omega) = \varepsilon_{FI}$$

$$\varphi(\omega) = \varphi_{FI} + \frac{\Delta\varphi}{2} \cdot \left( Tri\left(\frac{f + f_s/4}{f_s/4}\right) - Tri\left(\frac{f - f_s/4}{f_s/4}\right) \right)$$

$$\varepsilon(\omega) + j\varphi(\omega) = \varepsilon_{FI} + j\varphi_{FI} + j \cdot \frac{\Delta\varphi}{2} \cdot \left( Tri\left(\frac{f + f_s/4}{f_s/4}\right) - Tri\left(\frac{f - f_s/4}{f_s/4}\right) \right)$$

$$c[n] = F^{-1}\left\{ \varepsilon_{FI} + j\varphi_{FI} + j \cdot \frac{\Delta\varphi}{2} \cdot \left( Tri\left(\frac{f + f_s/4}{f_s/4}\right) - Tri\left(\frac{f - f_s/4}{f_s/4}\right) \right) \right\}$$

$$= (\varepsilon_{FI} + j\varphi_{FI}) \cdot \delta[n] + j \cdot \frac{\Delta\varphi}{2} \cdot F^{-1}$$

$$\left\{ Tri\left(\frac{f + f_s/4}{f_s/4}\right) - Tri\left(\frac{f - f_s/4}{f_s/4}\right) \right\}$$

$$= (\varepsilon_{FI} + j\varphi_{FI}) \cdot \delta[n] + \Delta\varphi \cdot F^{-1}\left\{ Tri\left(\frac{f}{f_s/4}\right) \right\} \cdot \sin\left[\frac{\pi}{2}n\right]$$

$$= (\varepsilon_{FI} + j\varphi_{FI}) \cdot \delta[n] + \frac{\Delta\varphi}{4} \cdot sinc^2\left[\frac{1}{4}n\right] \cdot \sin\left[\frac{\pi}{2}n\right],$$

where
 $\varepsilon(\omega)$ represents a modified FDIQ amplitude mismatch,
 $j\varphi(\omega)$ represents a modified FDIQ phase mismatch,
 $\varepsilon(\omega)+j\varphi(\omega)$ represents the modified FDIQ mismatch,
 c[n] represents the Fourier coefficients,
 $F^{-1}\{\bullet\}$ represents the inverse Fourier transform,
 $\varepsilon_{FI}$ represents a frequency-independent IQ (FIIQ) amplitude mismatch or $(\varepsilon(-f_m)+\varepsilon(f_m))/2$,
 $\varphi_{FI}$ represents a FIIQ phase mismatch or $(\varphi(-f_m)+\varphi(f_m))/2$,
 $\Delta\varphi$ represents a phase mismatch difference or $\varphi(-f_s/4)-\varphi(f_s/4)$,
 $\Delta\varphi'$ represents a measured phase mismatch difference or $\varphi(-f_m)-\varphi(f_m)$,
 $f_m$, represents a measured frequency,
 $f_s$ represents the sampling rate of the FIR filter,
 Tri(f) represents a triangular function, and
 $\delta[n]$ represents a delta function.
 Equations 3

The Fourier coefficients of the modified FDIQ mismatch (c[n]) may include two terms. The first term may be the delta function from the FIIQ mismatch and the second term may be from the FDIQ mismatch. As a result of modifying the FDIQ phase mismatch ($\varphi(\omega)$), the second term of the Fourier coefficients of the FDIQ mismatch may be a purely real number and the coefficients for the even numbers of n may all be zero. Also, the modified and regenerated FDIQ mismatch may be an odd function in the frequency domain and its Fourier coefficient may also be an odd function (or c[−n]=−c[n]), which makes further simplification of the FIR filter possible. By modifying the FDIQ mismatch in this way, the FIR filter for FDIQ mismatch compensation can be made smaller and consume less power without suffering any significant performance degradation within the calibration bandwidth from frequencies $-f_s/4$ to $f_s/4$.

Figure 12:
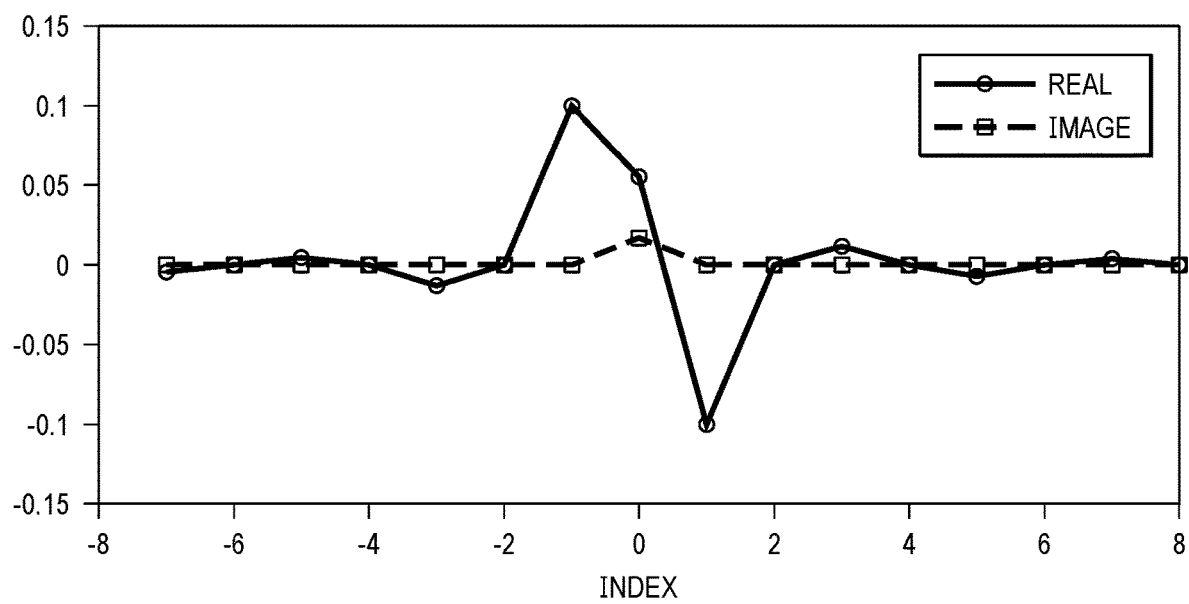
FIG. 12 is a diagram showing the Fourier coefficients for −7≤n≤8, according to some embodiments.

FIG. 12 is a diagram showing the Fourier coefficients for $-7 \le n \le 8$, according to some embodiments. In the diagram, the x-axis represents an index (n) and the y-axis represents the Fourier coefficients (c[n]). As shown in the diagram, 1) the imaginary part of c[n] is all zero except when n=0; 2) c[n]=0 if n is an even number; and 3) the real part of c[n] is an odd function.

The FDIQ mismatch compensation FIR filter has a finite number of taps, and the FIR filter coefficients may be extracted based on windowing the Fourier coefficients of the FDIQ mismatch to suppress the discontinuity. In an embodiment, a Hamming window with a length of 4N+1 is used to determine the FIR coefficients for the FIR filter according to equation 4 provided below. In an embodiment, the Hamming window has a length that corresponds to the coefficients. Accordingly, in the below equation, the coefficients are $-(2N-1)<=n<=(2N-1)$ so its length is 4N+1. Thus, a Hamming window with a length of (4N+1) is used.

$$\varepsilon[n] + j\varphi[n] = c[n] \circ w[n]$$

$$= (\varepsilon_{FI} + j\varphi_{FI}) \cdot \delta[n] + \left( \frac{\Delta\varphi}{4} \cdot sinc^2\left[\frac{1}{4}n\right] \cdot \sin\left[\frac{\pi}{2}n\right] \right) \circ w[n]$$

$$= (\varepsilon_{FI} + j\varphi_{FI}) \cdot \delta[n] + \left( \frac{\Delta\varphi'}{16} \cdot \frac{f_s}{f_m} \cdot sinc^2\left[\frac{1}{4}n\right] \cdot \sin\left[\frac{\pi}{2}n\right] \right) \circ w[n],$$

$$-(2N - 1) \le n \le (2N - 1),$$

where
 ($\circ$) represents an element-wise product operator,
 w[n] represents a hamming window with a length of (4N+1), and
 N represents a number of addition real coefficients for FDIQ mismatch compensation
 Equations 4

The value of N may be configurable depending on the system requirements. In an embodiment (e.g., in a system that is based on IEEE 802.11ah), N=2. For example, the Fourier coefficients and the FIR coefficients may be calculated using equations 5 for the case where N=2:

$$c[n] = [\ldots \; c_0 \; c_1 \; c_2 \; c_3 \; \ldots][c_0 \; c_1 \; c_2 \; c_1 \; \ldots] \quad \text{Equation 5}$$

$$= [\varepsilon_{FI} + j\varphi_{FI} \; 0 \; 0 \; 0 \; \ldots] + \frac{\Delta\varphi'}{16} \cdot \frac{f_s}{f_m} \cdot$$

$$[0 \; 0.8106 \; 0 \; -0.0901 \; \ldots]$$

$$\varepsilon[n] + j\varphi[n] = [\varepsilon_0 + j\varphi_0 \; \varepsilon_1 \; 0 \; \varepsilon_3]$$

$$= [c_0 \; c_1 \; c_2 \; c_3] \circ [w_0 \; w_1 \; w_2 \; w_3]$$

$$= \left( [\varepsilon_{FI} + j\varphi_{FI} \; 0 \; 0 \; 0] + \frac{\Delta\varphi'}{16} \cdot \frac{f_s}{f_m} \cdot \right) \circ$$
$$[0 \; 0.8106 \; 0 \; -0.0901]$$
$$[1 \; 0.8653 \; 0.540 \; 0.2147]$$

$$= [\varepsilon_{FI} + j\varphi_{FI} \; 0 \; 0 \; 0] + \Delta\varphi' \cdot \frac{f_s}{f_m} \cdot$$

$$[0 \; 0.1754 \; 0 \; -0.0048]$$

$$= \left[ \varepsilon_{FI} + j\varphi_{FI} \; 0.0438 \cdot \Delta\varphi' \cdot \frac{f_s}{f_m} \; 0 \; -0.0012 \cdot \Delta\varphi' \cdot \frac{f_s}{f_m} \right],$$

$$0 \le n \le (2N - 1) \text{ and } \varepsilon[-n] = -\varepsilon[n]$$

Figure 13A:
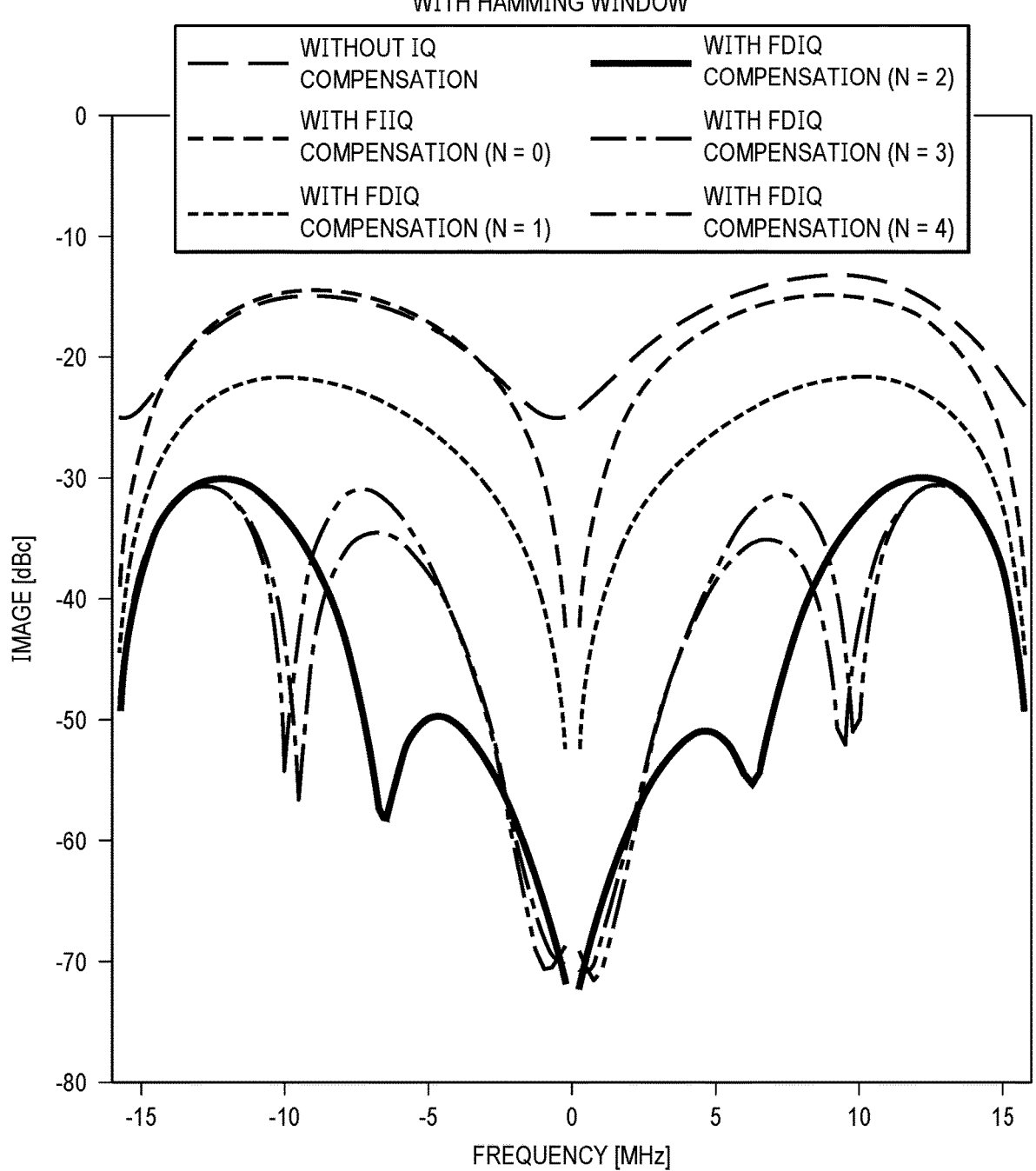

FIG. 13A and FIG. 13B are diagrams showing a simulated image level with various IQ compensation settings when using the FDIQ mismatch compensation techniques disclosed herein with and without using a hamming window, according to some embodiments. The diagrams show a simulated image level for a case with a 1 decibel (dB) amplitude mismatch and a 2 degree phase mismatch for FDIQ mismatch and 12 nanosecond (nsec) IQ time skew for FDIQ mismatch. In the diagrams, N represents the number of filter taps for FDIQ mismatch compensation. The diagrams show that, in general, the performance of FDIQ mismatch compensation improves as filter length increases (as N increases). As shown in FIG. 13A, the compensated image performance with N=2 and Hamming windowing is −40 dB for 8 MHz and −50 dB for 7 MHz offset frequencies. This performance is acceptable for a narrow band system such as systems based on IEEE 802.11ah standards. For the case of an IEEE 802.11ah 1 MHz channel bandwidth, the image at ±1 MHz offset frequency should be lower than −40 dB to meet the spectrum emission mask. For the case of a IEEE 802.11ah 4 MHz channel bandwidth, the image at ±4 MHz offset frequency should be lower than −30 dB to meet the error vector magnitude (EVM) requirement. Also, the image at ±6 MHz (=±4 MHz/2×3) offset frequency should be lower than −30 dB to avoid the digital predistortion (DPD) performance degradation. As shown in FIG. 13A, the image performance using the techniques disclosed herein meet the requirements with sufficient margin.

Based on testing, it has been shown that the use of the FDIQ mismatch compensation technique disclosed herein achieves excellent image rejection performance with the IEEE 802.11ah 1 MHz channel signal with different offset frequencies.

Figure 14:
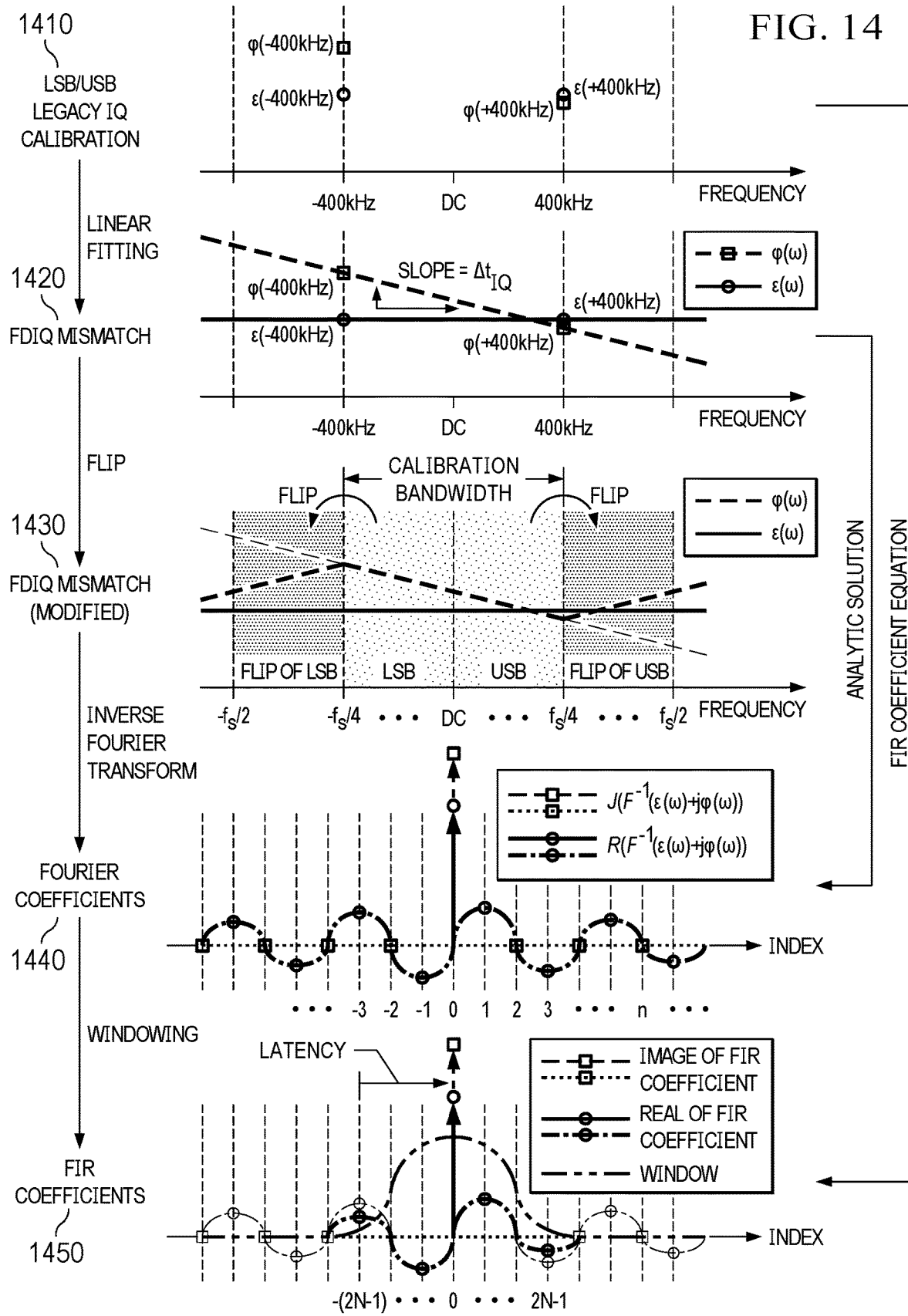
FIG. 14 is a diagram showing the overall FDIQ mismatch compensation calibration procedure, according to some embodiments.

FIG. 14 is a diagram showing the overall FDIQ mismatch compensation calibration procedure, according to some embodiments.

The first step 1410 is to perform LSB/USB IQ calibration. The IQ amplitude and phase mismatch (e.g., $\varepsilon(-400\ \text{kHz})$, $\varphi(-400\ \text{kHz})$, $\varepsilon(+400\ \text{kHz})$, $\varphi(+400\ \text{kHz})$) is detected at two measured frequencies (one frequency in the LSB and one frequency in the USB). In the example shown in the diagram, −400 kHz is used for LSB and +400 kHz is used for USB. It should be appreciated that other frequencies can be used for this purpose.

The second step 1420 is to determine the FDIQ mismatch ($\varepsilon(\omega)$ and $\varphi(\omega)$) for the RF transmitter based on linear fitting the measured IQ amplitude and phase mismatch ($\varepsilon(-400\ \text{kHz})$, $\varphi(-400\ \text{kHz})$, $\varepsilon(+400\ \text{kHz})$, $\varphi(+400\ \text{kHz})$).

The third step 1430 is to modify the FDIQ phase mismatch based on flipping the FDIQ phase mismatch ($\varphi(\omega)$) in the LSB and flipping the FDIQ phase mismatch in the USB to generate a modified FDIQ phase mismatch. In an embodiment, the modified FDIQ phase mismatch does not have any discontinuity at the IFFT boundary and $(E_{FI}+j\varphi_{FI})$ is an odd function.

The fourth step 1440 is to determine the Fourier coefficients based on applying the IFFT to the modified FDIQ mismatch ($\varepsilon(\omega)+j\varphi(\omega)$).

The fifth step 1450 is to determine the FIR coefficients based on windowing the Fourier coefficients. In an embodiment, the windowing uses a Hamming window. For example, the FIR coefficients may be calculated/determined using equations 3 provided herein above. The "Latency" shown in the diagram represents the FIR filter processing delay. Using the FDIQ mismatch compensation calibration procedure can reduce the number of FIR filter taps, which allows for less latency. "−(2N−1) to 2N−1" shown in the diagram represent FIR filter coefficients index.

Embodiments of the FDIQ mismatch compensation technique disclosed herein can provide one or more advantages over existing techniques. An advantage of embodiments disclosed herein is that the FIR filter can consume less power and have a smaller footprint, while still providing excellent image rejection performance for the calibration bandwidth. While certain advantages are mentioned here, those skilled in the art will appreciate that the FDIQ mismatch compensation technique disclosed herein can provide other advantages in view of the present disclosure.

Figure 15:
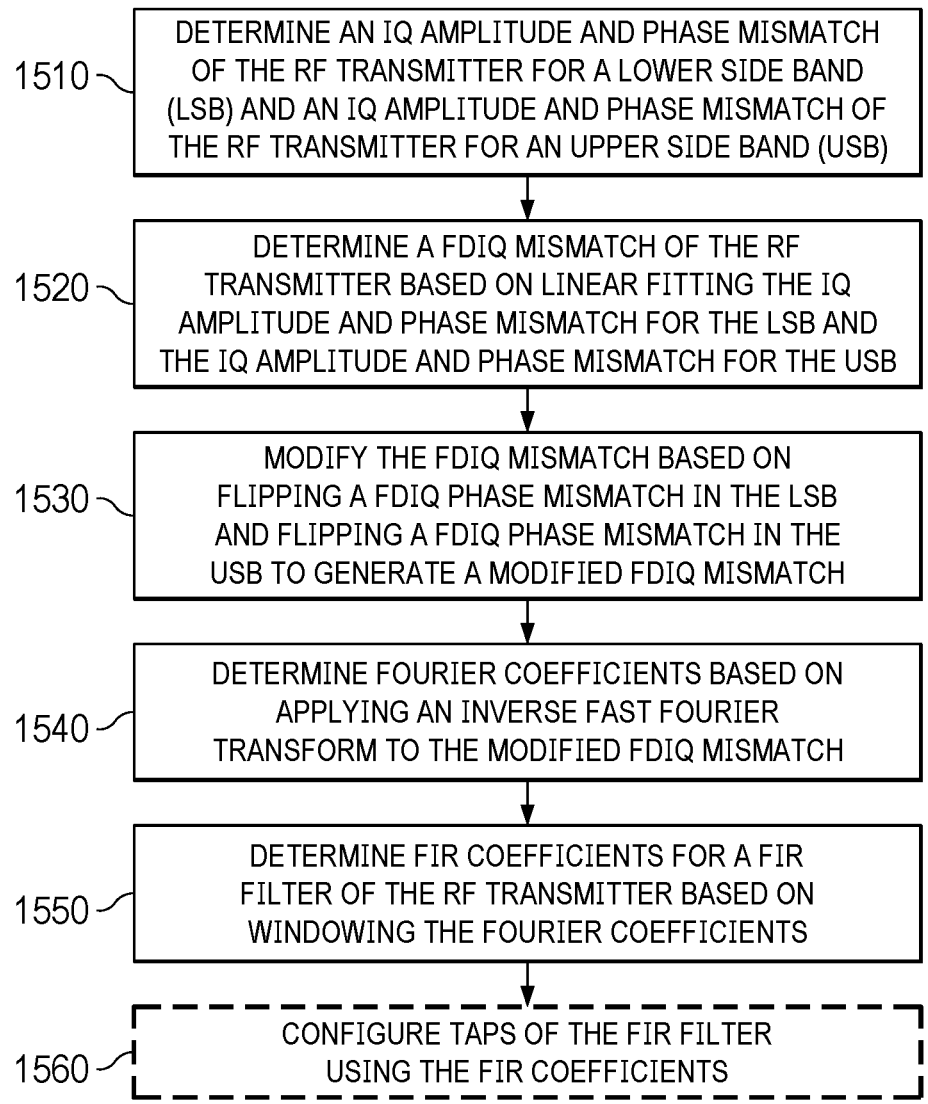
FIG. 15 is a flow diagram of a method for calibrating a RF transmitter to compensate for a frequency-dependent in-phase quadrature (FDIQ) mismatch, according to some embodiments.

FIG. 15 is a flow diagram of a method for calibrating a RF transmitter to compensate for a frequency-dependent in-phase quadrature (FDIQ) mismatch, according to some embodiments.

Although shown in a particular order, in some embodiments the operations shown in the diagram may be performed in a different order. For example, although the operations shown in the diagram are shown in a particular sequential order, some of the operations may be performed in partially or entirely overlapping time periods.

At operation 1510, the method determines an IQ amplitude and phase mismatch of the RF transmitter for a lower side band (LSB) and an IQ amplitude and phase mismatch of the RF transmitter for an upper side band (USB). In an embodiment (e.g., for a RF transmitter supporting IEEE 802.11ah 1 MH bandwidth), the IQ amplitude and phase mismatch for the LSB is determined at a frequency of −400 kilohertz (kHz) and the IQ amplitude and phase mismatch for the USB is determined at a frequency of +400 kHz, but it should be appreciated that other frequencies can be used.

At operation 1520, the method determines a FDIQ mismatch of the RF transmitter based on linear fitting the IQ amplitude and phase mismatch for the LSB and the IQ amplitude and phase mismatch for the USB.

At operation 1530, the method modifies the FDIQ mismatch based on flipping a FDIQ phase mismatch in the LSB and flipping a FDIQ phase mismatch in the USB to generate a modified FDIQ mismatch. In an embodiment, the modifying the FDIQ mismatch includes regenerating a FDIQ phase mismatch from frequencies $-f_s/2$ to $-f_s/4$ based on flipping a FDIQ phase mismatch from frequencies $-f_s/4$ to 0 Hertz and regenerating a FDIQ phase mismatch from frequencies $f_s/4$ to $f_s/2$ based on flipping a FDIQ phase mismatch between frequencies 0 Hertz to $f_s/4$, wherein $f_s$ represents a sampling rate of the FIR filter (e.g., as shown in FIG. 11).

At operation 1540, the method determines Fourier coefficients based on applying an IFFT to the modified FDIQ mismatch. In an embodiment, the modified FDIQ mismatch and the Fourier coefficients are expressed according to equations 3 provided herein above.

At operation 1550, the method determines FIR coefficients for a FIR filter of the RF transmitter based on windowing the Fourier coefficients. In an embodiment, the windowing uses a Hamming window. However, it should be appreciated that other type of window filters can be used. In an embodiment, the FIR coefficients are determined using equation 4 provided herein above.

In an embodiment, at operation 1560, the method configures taps of the FIR filter using the FIR coefficients (e.g., so that the FIR filter compensates for the FDIQ mismatch (phase and amplitude mismatch)).

In an embodiment, the FIR filter is included in an IQ mismatch compensation module of the RF transmitter (e.g., IQ/LO compensation module 612). In an embodiment, the IQ mismatch compensation module receives signals from a RF DPD module of the RF transmitter and outputs signals to an I-path baseband DPD module and a Q-path baseband DPD module of the RF transmitter.

In some embodiments, the solutions and techniques provided herein may be or may be embodied in an article of manufacture in which a non-transitory machine-readable medium (such as microelectronic memory) has stored thereon instructions (also referred to as "computer code") which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions (also referred to as "computer code")) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure include electronic devices, e.g., one or more packaged semiconductor devices, configured to perform one or more of the operations described herein. Embodiments of the present disclosure may be implemented in a single semiconductor die. However, embodiments are not limited thereto.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for calibrating a radio frequency (RF) transmitter to compensate for a frequency-dependent in-phase quadrature (FDIQ) mismatch of the RF transmitter, the method comprising:
   determining an in-phase quadrature (IQ) amplitude and phase mismatch of the RF transmitter for a lower side band (LSB) and an IQ amplitude and phase mismatch of the RF transmitter for an upper side band (USB);
   determining the FDIQ mismatch based on linear fitting the IQ amplitude and phase mismatch for the LSB and the IQ amplitude and phase mismatch for the USB;
   modifying the FDIQ mismatch based on flipping a FDIQ phase mismatch in the LSB and flipping a FDIQ phase mismatch in the USB to generate a modified FDIQ mismatch;
   determining Fourier coefficients based on applying an inverse fast Fourier transform to the modified FDIQ mismatch; and
   determining FIR coefficients for a finite impulse response (FIR) filter of the RF transmitter based on windowing the Fourier coefficients.

2. The method of claim 1, further comprising:
   configuring taps of the FIR filter using the FIR coefficients so that the FIR filter compensates for the FDIQ mismatch.

3. The method of claim 2, wherein the FIR filter is included in an IQ mismatch compensation module of the RF transmitter.

4. The method of claim 3, wherein the IQ mismatch compensation module receives signals from a RF digital pre-distortion (DPD) module of the RF transmitter and outputs signal to an I path baseband DPD module and a Q path baseband DPD module of the RF transmitter.

5. The method of claim 1, wherein the flipping the FDIQ phase mismatch in the LSB includes regenerating a FDIQ phase mismatch from frequencies $-f_s/2$ to $-f_s/4$ based on flipping a FDIQ phase mismatch from frequencies $-f_s/4$ to 0 Hertz and the flipping the FDIQ mismatch in the USB includes regenerating a FDIQ phase mismatch from frequencies $f_s/4$ to $f_s/2$ based on flipping a FDIQ phase mismatch between frequencies 0 Hertz to $f_s/4$, wherein $f_s$ represents a sampling rate of the FIR filter.

6. The method of claim 5, wherein the modified FDIQ mismatch and the Fourier coefficients are expressed according to the following equations:

$$\varepsilon(\omega) = \varepsilon_{FI}\varphi(\omega)$$

$$= \varphi_{FI} + \frac{\Delta\varphi}{2} \cdot \left(Tri\left(\frac{f+f_s/4}{f_s/4}\right) - Tri\left(\frac{f-f_s/4}{f_s/4}\right)\right)\varepsilon(\omega) + j\varphi(\omega)$$

$$= \varepsilon_{FI} + j\varphi_{FI} + j \cdot \frac{\Delta\varphi}{2} \cdot \left(Tri\left(\frac{f+f_s/4}{f_s/4}\right) - Tri\left(\frac{f-f_s/4}{f_s/4}\right)\right)$$

$$c[n] = F^{-1}\left\{\varepsilon_{FI} + j\varphi_{FI} + j \cdot \frac{\Delta\varphi}{2} \cdot \left(Tri\left(\frac{f+f_s/4}{f_s/4}\right) - Tri\left(\frac{f-f_s/4}{f_s/4}\right)\right)\right\}$$

$$= (\varepsilon_{FI} + j\varphi_{FI}) \cdot \delta[n] + j \cdot \frac{\Delta\varphi}{2} \cdot$$

$$F^{-1}\left\{Tri\left(\frac{f+f_s/4}{f_s/4}\right) - Tri\left(\frac{f-f_s/4}{f_s/4}\right)\right\}$$

$$= (\varepsilon_{FI} + j\varphi_{FI}) \cdot \delta[n] + \Delta\varphi \cdot F^{-1}\left\{Tri\left(\frac{f}{f_s/4}\right)\right\} \cdot \sin\left[\frac{\pi}{2}n\right]$$

$$= (\varepsilon_{FI} + j\varphi_{FI}) \cdot \delta[n] + \frac{\Delta\varphi}{4} \cdot sinc^2\left[\frac{1}{4}n\right] \cdot \sin\left[\frac{\pi}{2}n\right],$$

wherein
ε(ω) represents a modified FDIQ amplitude mismatch,
jφ(ω) represents a modified FDIQ phase mismatch,
ε(ω)+jφ(ω) represents the modified FDIQ mismatch,
c[n] represents the Fourier coefficients,
n represents an index,
$F^{-1}\{\bullet\}$ represents the inverse Fourier transform,
$\varepsilon_{FI}$ represents a frequency-independent IQ (FIIQ) amplitude mismatch or $(\varepsilon(-f_m)+\varepsilon(f_m))/2$,
$\varphi_{FI}$ represents a FIIQ phase mismatch or $(\varphi(-f_m)+\varphi(f_m))/2$,
Δφ represents a phase mismatch difference or $\varphi(-f_s/4)-\varphi(f_s/4)$,
Δφ' represents a measured phase mismatch difference or $\varphi(-f_m)-\varphi(f_m)$,
$f_m$, represents a measured frequency,
$f_s$ represents the sampling rate of the FIR filter,
Tri(f) represents a triangular function, and
δ[n] represents a delta function.

7. The method of claim 6, wherein the FIR coefficients are determined using the following equation:

$$\varepsilon[n] + j\varphi[n] = c[n] \circ w[n] = (\varepsilon_{FI} + j\varphi_{FI}) \cdot \delta[n] + \left(\frac{\Delta\varphi}{4} \cdot sinc^2\left[\frac{1}{4}n\right] \cdot \sin\left[\frac{\pi}{2}n\right]\right) \circ$$

$$w[n] = (\varepsilon_{FI} + j\varphi_{FI}) \cdot \delta[n] + \left(\frac{\Delta\varphi'}{16} \cdot \frac{f_s}{f_m} \cdot sinc^2\left[\frac{1}{4}n\right] \cdot \sin\left[\frac{\pi}{2}n\right]\right) * w[n]$$

$$\varepsilon[n] + j\varphi[n] = c[n] * w[n]$$

$$= (\varepsilon_{FI} + j\varphi_{FI}) \cdot \delta[n] + \left(\frac{\Delta\varphi}{4} \cdot sinc^2\left[\frac{1}{4}n\right] \cdot \sin\left[\frac{\pi}{2}n\right]\right) \circ w[n],$$

$-(2N-1) \leq n \leq (2N-1)$, wherein
(∘) represents an element-wise product operator,
w[n] represents a hamming window with a length of (4N+1), and
N represents a number of addition real coefficients for FDIQ mismatch compensation.

8. The method of claim 1, wherein the windowing uses a Hamming window.

9. The method of claim 1, wherein the IQ amplitude and phase mismatch for the LSB is determined at a frequency of −400 kilohertz (kHz) and the IQ amplitude and phase mismatch for the USB is determined at a frequency of +400 kHz.

10. A non-transitory machine-readable storage medium having computer code stored therein, which when executed by one or more processors of a computing system, causes the computing system to perform operations for calibrating a radio frequency (RF) transmitter to compensate for a frequency-dependent in-phase quadrature (FDIQ) mismatch of the RF transmitter, the operations comprising:
determining an in-phase quadrature (IQ) amplitude and phase mismatch of the RF transmitter for a lower side band (LSB) and an IQ amplitude and phase mismatch of the RF transmitter for an upper side band (USB);
determining the FDIQ mismatch based on linear fitting the IQ amplitude and phase mismatch for the LSB and the IQ amplitude and phase mismatch for the USB;
modifying the FDIQ mismatch based on flipping a FDIQ phase mismatch in the LSB and flipping a FDIQ phase mismatch in the USB to generate a modified FDIQ mismatch;
determining Fourier coefficients based on applying an inverse fast Fourier transform to the modified FDIQ mismatch; and
determining FIR coefficients for a finite impulse response (FIR) filter of the RF transmitter based on windowing the Fourier coefficients.

11. The non-transitory machine-readable storage medium of claim 10, wherein the operations further comprise:
configuring taps of the FIR filter using the FIR coefficients so that the FIR filter compensates for the FDIQ mismatch.

12. The non-transitory machine-readable storage medium of claim 11, wherein the FIR filter is included in an IQ mismatch compensation module of the RF transmitter.

13. The non-transitory machine-readable storage medium of claim 12, wherein the IQ mismatch compensation module receives signals from a RF digital pre-distortion (DPD) module of the RF transmitter and outputs signal to an I path baseband DPD module and a Q path baseband DPD module of the RF transmitter.

14. The non-transitory machine-readable storage medium of claim 10, wherein the flipping the FDIQ phase mismatch in the LSB includes regenerating a FDIQ phase mismatch from frequencies $-f_s/2$ to $-f_s/4$ based on flipping a FDIQ phase mismatch from frequencies $-f_s/4$ to 0 Hertz and the flipping the FDIQ phase mismatch in the USB includes regenerating a FDIQ phase mismatch from frequencies $f_s/4$ to $f_s/2$ based on flipping a FDIQ phase mismatch between frequencies 0 Hertz to $f_s/4$, wherein $f_s$ represents a sampling rate of the FIR filter.

15. The non-transitory machine-readable storage medium of claim 14, wherein the modified FDIQ mismatch and the Fourier coefficients are expressed according to the following equations:

$$\varepsilon(\omega) = \varepsilon_{FI}\varphi(\omega)$$

$$= \varphi_{FI} + \frac{\Delta\varphi}{2} \cdot \left(Tri\left(\frac{f+f_s/4}{f_s/4}\right) - Tri\left(\frac{f-f_s/4}{f_s/4}\right)\right)\varepsilon(\omega) + j\varphi(\omega)$$

$$= \varepsilon_{FI} + j\varphi_{FI} + j \cdot \frac{\Delta\varphi}{2} \cdot \left(Tri\left(\frac{f+f_s/4}{f_s/4}\right) - Tri\left(\frac{f-f_s/4}{f_s/4}\right)\right)$$

$$c[n] = F^{-1}\left\{\varepsilon_{FI} + j\varphi_{FI} + j \cdot \frac{\Delta\varphi}{2} \cdot \left(Tri\left(\frac{f+f_s/4}{f_s/4}\right) - Tri\left(\frac{f-f_s/4}{f_s/4}\right)\right)\right\}$$

$$= (\varepsilon_{FI} + j\varphi_{FI}) \cdot \delta[n] + j \cdot \frac{\Delta\varphi}{2} \cdot$$

$$F^{-1}\left\{Tri\left(\frac{f+f_s/4}{f_s/4}\right) - Tri\left(\frac{f-f_s/4}{f_s/4}\right)\right\}$$

$$= (\varepsilon_{FI} + j\varphi_{FI}) \cdot \delta[n] + \Delta\varphi \cdot F^{-1}\left\{Tri\left(\frac{f}{f_s/4}\right)\right\} \cdot \sin\left[\frac{\pi}{2}n\right]$$

$$= (\varepsilon_{FI} + j\varphi_{FI}) \cdot \delta[n] + \frac{\Delta\varphi}{4} \cdot sinc^2\left[\frac{1}{4}n\right] \cdot \sin\left[\frac{\pi}{2}n\right],$$

wherein
ε(ω) represents a modified FDIQ amplitude mismatch,
jφ(ω) represents a modified FDIQ phase mismatch,
ε(ω)+jφ(ω) represents the modified FDIQ mismatch,
c[n] represents the Fourier coefficients,
n represents an index,
$F^{-1}\{\cdot\}$ represents the inverse Fourier transform,
$\varepsilon_{FI}$ represents a frequency-independent IQ (FIIQ) amplitude mismatch or $(\varepsilon(-f_m)+\varepsilon(f_m))/2$,
$\varphi_{FI}$ represents a FIIQ phase mismatch or $(\varphi(-f_m)+\varphi(f_m))/2$,
Δφ represents a phase mismatch difference or $\varphi(-f_s/4)-\varphi(f_s/4)$,
Δφ' represents a measured phase mismatch difference or $\varphi(-f_m)-\varphi(f_m)$,
$f_m$, represents a measured frequency,
$f_s$ represents the sampling rate of the FIR filter, Tri(f) represents a triangular function, and
δ[n] represents a delta function.

16. The non-transitory machine-readable storage medium of claim 15, wherein the FIR coefficients are determined using the following equation:

$$\varepsilon[n] + j\varphi[n] = c[n] \circ w[n] = (\varepsilon_{FI} + j\varphi_{FI}) \cdot \delta[n] + \left(\frac{\Delta\varphi}{4} \cdot sinc^2\left[\frac{1}{4}n\right] \cdot \sin\left[\frac{\pi}{2}n\right]\right) \circ$$

$$w[n] = (\varepsilon_{FI} + j\varphi_{FI}) \cdot \delta[n] + \left(\frac{\Delta\varphi'}{16} \cdot \frac{f_s}{f_m} \cdot sinc^2\left[\frac{1}{4}n\right] \cdot \sin\left[\frac{\pi}{2}n\right]\right) * w[n]$$

$$\varepsilon[n] + j\varphi[n] = c[n] * w[n]$$

$$= (\varepsilon_{FI} + j\varphi_{FI}) \cdot \delta[n] + \left(\frac{\Delta\varphi}{4} \cdot sinc^2\left[\frac{1}{4}n\right] \cdot \sin\left[\frac{\pi}{2}n\right]\right) \circ w[n],$$

$$-(2N-1) \le n \le (2N-1),$$

wherein
(∘) represents an element-wise product operator,
w[n] represents a hamming window with a length of (4N+1), and
N represents a number of addition real coefficients for FDIQ mismatch compensation.

17. The non-transitory machine-readable storage medium of claim 10, wherein the windowing uses a Hamming window.

18. The non-transitory machine-readable storage medium of claim 10, wherein the IQ amplitude and phase mismatch for the LSB is determined at a frequency of −400 kilohertz (kHz) and the IQ amplitude and phase mismatch for the USB is determined at a frequency of +400 KHz.

19. A radio frequency (RF) transmitter comprising:
a frequency-dependent in-phase quadrature (FDIQ) compensation circuit comprising a finite impulse response (FIR) filter, wherein the FIR filter is configured with FIR coefficients that are determined based on modifying a FDIQ mismatch of the RF transmitter based on flipping portions of the FDIQ mismatch of the RF transmitter, applying an inverse fast Fourier transform to the modified FDIQ mismatch to generate Fourier coefficients, and windowing the Fourier coefficients.

* * * * *